United States Patent
McComsey et al.

(10) Patent No.: US 9,827,820 B2
(45) Date of Patent: Nov. 28, 2017

(54) HANGER FOR AXLE/SUSPENSION SYSTEMS

(71) Applicant: HENDRICKSON USA, L.L.C., Itasca, IL (US)

(72) Inventors: Keith D. McComsey, Hinckley, OH (US); Kimm L. Carr, Johnson City, TN (US); Brett L. Muckelrath, North Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 15/073,729

(22) Filed: Mar. 18, 2016

(65) Prior Publication Data

US 2016/0272025 A1   Sep. 22, 2016

Related U.S. Application Data

(60) Provisional application No. 62/135,765, filed on Mar. 20, 2015.

(51) Int. Cl.
*B60G 9/00* (2006.01)
*B60G 1/00* (2006.01)
(Continued)

(52) U.S. Cl.
CPC .............. *B60G 1/00* (2013.01); *B60G 7/008* (2013.01); *B62D 21/11* (2013.01);
(Continued)

(58) Field of Classification Search
CPC ..... B60G 7/02; B60G 9/02; B60G 2204/4302
(Continued)

(56) References Cited

U.S. PATENT DOCUMENTS 3,406,439 A * 10/1968 Hutchens ............... B60G 5/047
280/682
4,082,305 A    4/1978 Allison et al.
(Continued)

FOREIGN PATENT DOCUMENTS

EP        1918135 A2    5/2008
WO    200001547 A1    1/2000
(Continued)

OTHER PUBLICATIONS

DaimlerChrysler "New DCA trailer axle system", DaimlerChrysler Powersystems Axles, brochure.

*Primary Examiner* — Toan To
(74) *Attorney, Agent, or Firm* — Dureska & Moore, LLC; David P. Dureska; Brent L. Moore

(57) ABSTRACT

A hanger for axle/suspension systems of a heavy-duty vehicle includes an outboard wall spaced apart from an inboard wall. The outboard wall is connected to the inboard wall via a front wall. The outboard wall and the inboard wall are formed with an aligned opening extending through the outboard wall and the inboard wall. A top plate connected to the inboard wall, the outboard wall and the front wall. The top plate is formed with at least one circular opening or laterally oriented oblong-round opening and at least one laterally slotted opening. A fastener is disposed through the at least one circular opening or oblong-round opening. A second fastener is disposed through the at least one laterally slotted opening for mounting the hanger to a frame of the heavy-duty vehicle.

17 Claims, 8 Drawing Sheets

(51) Int. Cl.
  *B60G 7/00* (2006.01)
  *B62D 21/11* (2006.01)

(52) U.S. Cl.
  CPC .... *B60G 2204/143* (2013.01); *B60G 2204/15* (2013.01); *B60G 2204/4302* (2013.01); *B60G 2206/0112* (2013.01); *B60G 2206/601* (2013.01); *B60G 2206/82* (2013.01); *B60G 2206/8207* (2013.01)

(58) Field of Classification Search
  USPC ............. 280/121.116, 124.18, 787, 788, 789
  See application file for complete search history.

(56) References Cited

U.S. PATENT DOCUMENTS

| | | | |
|---|---|---|---|
| 4,116,640 A | 9/1978 | Leverenz | |
| 4,415,179 A | 11/1983 | Marinelli | |
| 5,037,126 A | 8/1991 | Gottschalk et al. | |
| 5,088,763 A | 2/1992 | Galazin et al. | |
| 5,118,131 A * | 6/1992 | Manning | B60G 7/02 280/124.109 |
| 5,171,036 A | 12/1992 | Ross | |
| 5,230,528 A | 6/1993 | Van Raden et al. | |
| 5,335,932 A | 8/1994 | Pierce | |
| 5,393,096 A | 2/1995 | Pierce et al. | |
| 5,861,581 A * | 1/1999 | Evans | G01G 19/08 177/136 |
| 6,286,857 B1 | 9/2001 | Reese et al. | |
| 6,659,479 B1 | 12/2003 | Raidel, II et al. | |
| 7,007,960 B2 | 3/2006 | Chalin et al. | |
| 7,198,298 B2 | 4/2007 | Ramsey | |
| 7,267,348 B1 | 9/2007 | Klein et al. | |
| 7,347,435 B2 | 3/2008 | Chalin | |
| 7,600,785 B2 | 10/2009 | Ramsey | |
| 7,731,211 B2 | 6/2010 | Ramsey | |
| 7,775,535 B2 * | 8/2010 | Bluff | B60G 7/02 280/124.116 |
| 8,006,990 B1 | 8/2011 | Davis et al. | |
| 8,454,040 B2 | 6/2013 | Westnedge et al. | |
| 8,459,666 B2 | 6/2013 | Piehl et al. | |
| 8,528,923 B2 | 9/2013 | Wakefield et al. | |
| 8,801,013 B2 | 8/2014 | Ramsey et al. | |
| 8,844,955 B2 | 9/2014 | Fulton et al. | |
| 9,315,083 B2 * | 4/2016 | Noble | B60G 7/02 |
| 2001/0035622 A1 * | 11/2001 | Fabris | B60G 7/02 280/104 |
| 2007/0126263 A1 * | 6/2007 | Ramsey | B60G 7/02 296/203.01 |
| 2009/0224503 A1 | 9/2009 | Richardson | |
| 2011/0163514 A1 | 7/2011 | Saieg et al. | |
| 2012/0080573 A1 | 4/2012 | Fulton et al. | |
| 2012/0126504 A1 | 5/2012 | Piehl et al. | |
| 2013/0154224 A1 | 6/2013 | Wakefield et al. | |

FOREIGN PATENT DOCUMENTS

| | | |
|---|---|---|
| WO | 200107524 A2 | 9/2001 |
| WO | 2010131949 A1 | 11/2010 |

\* cited by examiner

HANGER FOR AXLE/SUSPENSION SYSTEMS

CROSS-REFERENCE TO RELATED APPLICATION

This application claims the benefit of U.S. Provisional Patent Application Ser. No. 62/135,765, filed Mar. 20, 2015.

BACKGROUND OF THE INVENTION

Field of the Invention

The invention relates generally to tractor-trailers and to frames and sub-frames for tractor-trailers. More particularly the invention is directed to a hanger that attaches to the frame of a tractor-trailer and which is used to mount the axle/suspension system to the frame. More specifically, the invention is directed to a hanger that includes a plurality of slotted openings for mounting the hanger to a main member of a frame of a heavy-duty vehicle and at least one circular or oblong-round opening for mounting the hanger to a cross member of the frame of the heavy-duty vehicle. The invention provides the ability to pre-drill the opening patterns on the frame at the trailer original equipment manufacturer, thereby eliminating and/or reducing the need for matched-drilled openings at the time of installation of the hanger on the frame, and also eliminating multiple opening patterns for the hanger, and resulting in decreased cost and complexity of the hanger as well as providing improved adjustment and/or control of hanger spacing, thereby reducing irregular tire wear.

Background Art

Heavy-duty vehicles, such as tractor-trailers or semi-trailers, typically include one or more suspension assemblies that connect the wheel-bearing axles of the vehicle to the frame of the vehicle. Conventional or prior art frame designs were developed before the advent of air suspension systems for trailers. At that time, spring suspension systems were the suspension of choice for trailers. However, the spring suspension system resulted in a relatively rough ride to the cargo and did not equalize loads in all situations, thus creating the need for a frame design with soft ride characteristics and efficient load equalization characteristics. The subsequent development of air suspension systems provided improved ride quality for individual axles of semi-trailers as well as load equalization among multiple axles.

Load equalization is important because the amount of cargo that a trailer may carry is governed by local, state and/or national road and bridge laws, and is dependent on proper load distribution. The basic principle behind most road and bridge laws is to limit the maximum load that a vehicle may carry, as well as limit the maximum load that can be supported by individual axles. Therefore, the use of air suspension systems that can provide greater load equalization among multiple axles is preferred in order to enable the vehicle to carry as much cargo as is legally allowed.

In some heavy-duty vehicles, the suspension assemblies are connected directly to the primary frame of the vehicle. In other heavy-duty vehicles, the primary frame of the vehicle supports a sub-frame, and the suspension assemblies connect directly to the sub-frame. Sub-frames have been utilized on tractor-trailers for many years. The sub-frame is a box-like structure that is mounted on the underside of the trailer body of the tractor-trailer and one or more axle/suspension systems are suspended from the single sub-frame structure. For those heavy-duty vehicles that support a sub-frame, the sub-frame can be non-movable or movable, the latter being commonly referred to as a slider box, slider sub-frame, slider undercarriage, or secondary slider frame. A trailer having a slider box gains an advantage with respect to laws governing maximum axle loads. Proper placement of the slider box varies individual axle loads or redistributes the trailer loads so that it is within legal limits. Once properly positioned, the slider box is locked in place on the underside of the trailer by a retractable pin mechanism. For the purpose of convenience and clarity, reference herein will be made to frames, with the understanding that such reference is by way of example, and that the present invention applies to heavy-duty vehicle axle/suspension systems suspended from main members of primary frames, movable sub-frames and non-movable sub-frames.

The axle/suspension system is typically suspended from the main members by a pair of aligned and spaced-apart depending hangers. More specifically, each suspension assembly of an axle/suspension system includes a longitudinally extending elongated beam. Each beam typically is located adjacent to and below a respective one of a pair of spaced-apart longitudinally extending main members and one or more cross members, which form the frame of the vehicle. Each beam is pivotally connected at one of its ends to a hanger, which in turn is attached to and depends from a respective one of the main members of the frame of the vehicle. An axle extends transversely between and typically is connected by some means to the beams of the pair of suspension assemblies at a selected location from about the mid-point of each beam to the end of the beam opposite from its pivotal connection end. The end of each beam opposite from its pivotal connection also is connected to a bellows air spring or its equivalent, which in turn is connected to a respective one of the main members.

As set forth above, typical prior art hangers include a rigid connection or mount between the hanger and the underside of the main member of the frame of the vehicle. These rigid connections or mounts typically have consisted of welds and/or bolts. More particularly, a hanger having a generally U-shaped horizontal cross section is welded or bolted to the underside of the main member of the frame of the heavy-duty vehicle and may also be connected and/or mounted to one or more cross members of the frame of the vehicle. Bolting the hanger to the main member and cross member requires the placement of pre-drilled openings in the hanger as well as the main member and the cross member of the frame of the vehicle. However, because of tolerance stacks, the pre-drilled openings in the hanger often do not align properly with the pre-drilled openings in the main members and cross members of the frame. As a result, urging or forcing the hanger openings and the main member and cross member openings to align with one another can create improper hanger spacing, which can in turn lead to misalignment of the axle/suspension system. More specifically, misalignment of the axle/suspension system due to improper hanger spacing results in toe-in or toe-out conditions at the axle spindles of the axle/suspension system. These toe-in or toe-out conditions at the axle spindles can in turn potentially contribute to irregular tire wear. Axle/suspension systems that have less lateral compliance are especially susceptible to toe-in or toe-out conditions at the axle spindles due to improper or offset hanger spacing. Therefore, in order to assure proper hanger spacing, some manufacturers have turned to a process of forming matched-drilled openings in the main members and cross members of the frame based on the pre-drilled openings formed in the hangers. This method of installation assures proper hanger spacing, but can take significant time to complete because it takes significant man hours to form each of the matched-drilled openings in the main members and the cross members of the frame, thereby increasing manufacturing costs. Moreover, because there are many different main member and cross member frame configurations, multiple opening patterns must be formed on the top surface of each hanger to accommodate the various matched-drilled opening placements that occur on the main members and the cross members of the various possible vehicle frames on which a hanger may be ultimately mounted.

In the case where suspensions that self-steer are used, because the wheels/tires steer about a pivot point on the axle, there must be proper clearance for components to prevent wheel/tire rub to the main trailer and suspension components (i.e. trailer frame, suspension beam, suspension air spring, etc.). One method of providing clearance is to space the self-steer suspension frame brackets and beams further inboard than the remaining fixed suspensions on the trailer. This requires the suspension supporting structure of the trailer to accommodate a different spacing for the self-steer suspension only, which no longer matches the remaining fixed suspensions on the trailer, therefore requiring many unique trailer structure components.

Therefore, a need exists in the art for an improved hanger for axle/suspension systems which is free of multiple opening patterns previously required to fit multiple frame configurations, that eliminates and/or reduces the costs associated with matched-drilled openings in the main members and cross members of the frame, and that also allows for improved adjustment and/or control of hanger spacing, thereby avoiding toe-in and toe-out conditions at the axle spindles of the axle/suspension system, thereby reducing the potential for irregular tire wear, and also allowing for improved frame bracket and suspension beam spacing for self-steer suspensions that reduce the required variation in trailer designs that are currently needed to accommodate the self/steer suspensions with the accompanying fixed suspensions, while still maintaining proper clearance for steer components (tires/wheels).

The hanger for axle/suspension systems of the present invention solves the problems associated with prior art bolt-on hangers by including at least one circular or oblong-round opening at the hanger to cross member interface as well as a plurality of slotted openings at the hanger to main member interface. The circular or oblong-round opening at the hanger-to-cross member interface assures proper spacing and/or alignment of the hanger and in turn the axle/suspension system, while the slotted openings at the hanger-to-main member interface provide universal attachment to pre-drilled openings in the main members. The hanger for axle/suspension systems of the present invention allows the openings in the main members and cross members to be entirely or significantly pre-drilled while maintaining adjustability of the hanger and the axle/suspension system for purposes of alignment, thereby eliminating and/or reducing the costs associated with matched-drilled openings in the main members and cross members of the frame at the time of installation of the axle/suspension system to the frame of the vehicle, and also eliminating the need for multiple opening patterns or configurations in the hanger, instead allowing for a single universal opening pattern that allows for connection/mounting of the hanger to vehicles irrespective of frame configuration/opening pattern. The hanger for axle/suspension systems of the present invention also allows for improved adjustment and/or control of hanger spacing, thereby avoiding toe-in and toe-out conditions at the axle spindles of the axle/suspension system, and thereby reducing the potential for irregular tire wear, and also provides improved frame bracket and beam spacing eliminating the need for unique trailer sub-structure so that a trailer sub-structure more closely matched to fixed suspension installations can be utilized.

SUMMARY OF THE INVENTION

Objectives of the present invention include providing a hanger for axle/suspension systems that is free of multiple opening patterns previously required to fit multiple frame configurations.

A further objective of the present invention is to provide a hanger for axle/suspension systems that eliminates and/or reduces the costs associated with matched-drilled openings in the main members and cross members of the frame.

Yet another objective of the present invention is to provide a hanger for axle/suspension systems that allows for improved adjustment and/or control of hanger spacing, thereby avoiding toe-in and toe-out conditions at the axle spindles of the axle/suspension system and reducing the potential for irregular tire wear.

Still another objective of the present invention is to provide a hanger for axle/suspension systems that allows for improved frame and suspension beam spacing for self-steer suspensions, that reduce the variation in trailer designs that are currently needed to accommodate self/steer suspensions with the accompanying fixed suspensions, while still maintaining proper clearance for steer components (tires/wheels) in trailer designs that are currently unique to the remaining fixed suspensions while still maintaining proper clearance for steer components.

These objectives and advantages are obtained by the hanger for a suspension assembly of an axle/suspension system of a heavy-duty vehicle which includes an outboard wall laterally spaced apart from an inboard wall. The outboard wall and the inboard wall connected via a connecting wall. The outboard wall and the inboard wall each being formed with an aligned opening extending through the outboard wall and the inboard wall for pivotally connecting the suspension assembly to the hanger. A top plate connected to the inboard wall, the outboard wall and the connecting wall. The top plate being formed with at least one circular opening or oblong-round opening and at least one laterally slotted opening. A first fastener disposed through the at least one circular opening or oblong-round opening, and a second fastener disposed through the at least one laterally slotted opening, for mounting the hanger to a frame of the heavy-duty vehicle.

These objectives and advantages are also obtained by the method for mounting a hanger for a suspension assembly of an axle/suspension system of a heavy-duty vehicle, comprising the following steps: a) providing a hanger for a suspension assembly of an axle/suspension system of a heavy-duty vehicle, including an outboard wall laterally spaced apart from an inboard wall, the outboard wall connected to the inboard wall via a connecting wall, the outboard wall and the inboard wall being formed with an aligned opening extending through the outboard wall and the inboard wall for pivotally connecting the suspension assembly to the hanger, b) connecting a top plate to the inboard wall, the outboard wall and the connecting wall, the top plate being formed with at least one circular opening or oblong-round opening and at least one laterally slotted opening, c) disposing a first fastener through the at least one circular opening or oblong-round opening for mounting the hanger to a cross beam of a frame of the vehicle, and d) disposing a second fastener through the at least one laterally slotted opening for mounting the hanger to a main member of a frame of the heavy-duty vehicle.

BRIEF DESCRIPTION OF THE SEVERAL VIEWS OF THE DRAWINGS

The preferred embodiments of the present invention, illustrative of the best modes in which applicant has contemplated applying the principles, are set forth in the following description and are shown in the drawings, and are particularly and distinctly pointed out and set forth in the appended claims.

Similar numerals refer to similar parts throughout the drawings.

DESCRIPTION OF THE PREFERRED EMBODIMENT

Figure 1:
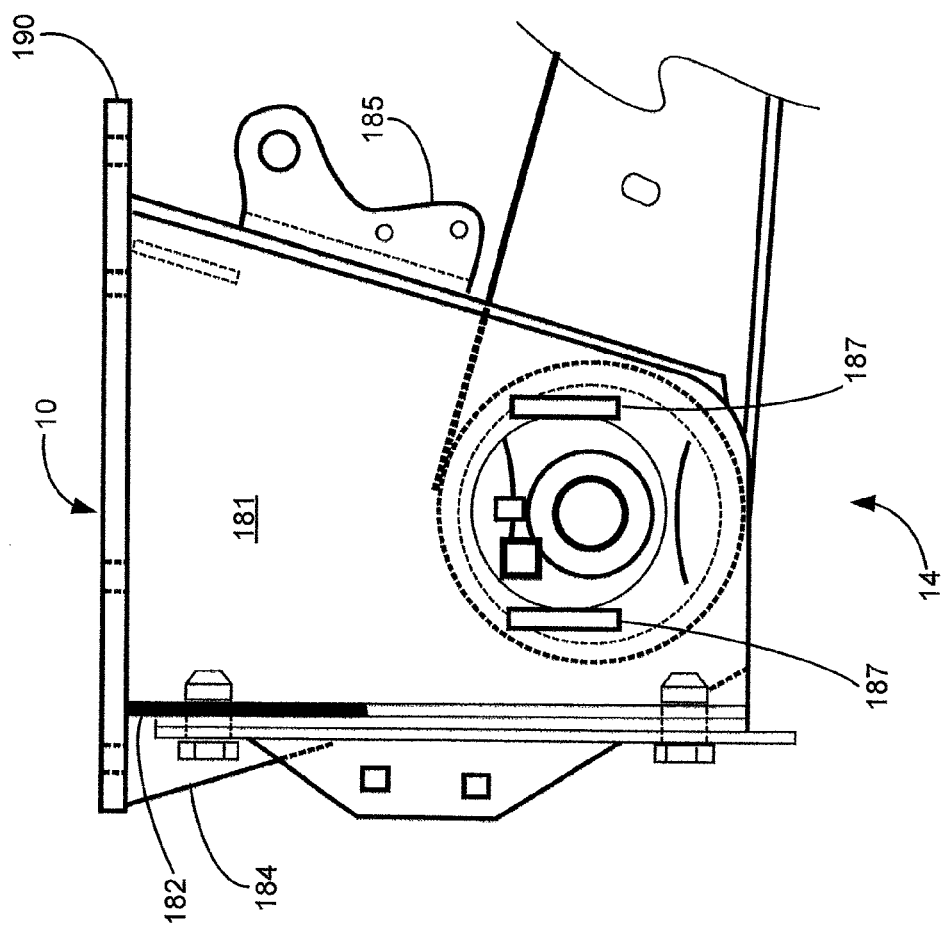
FIG. 1 is a fragmentary side view with hidden portions shown in broken lines, of a portion of a beam of a suspension assembly pivotally attached to a prior art hanger.
Figure 2:
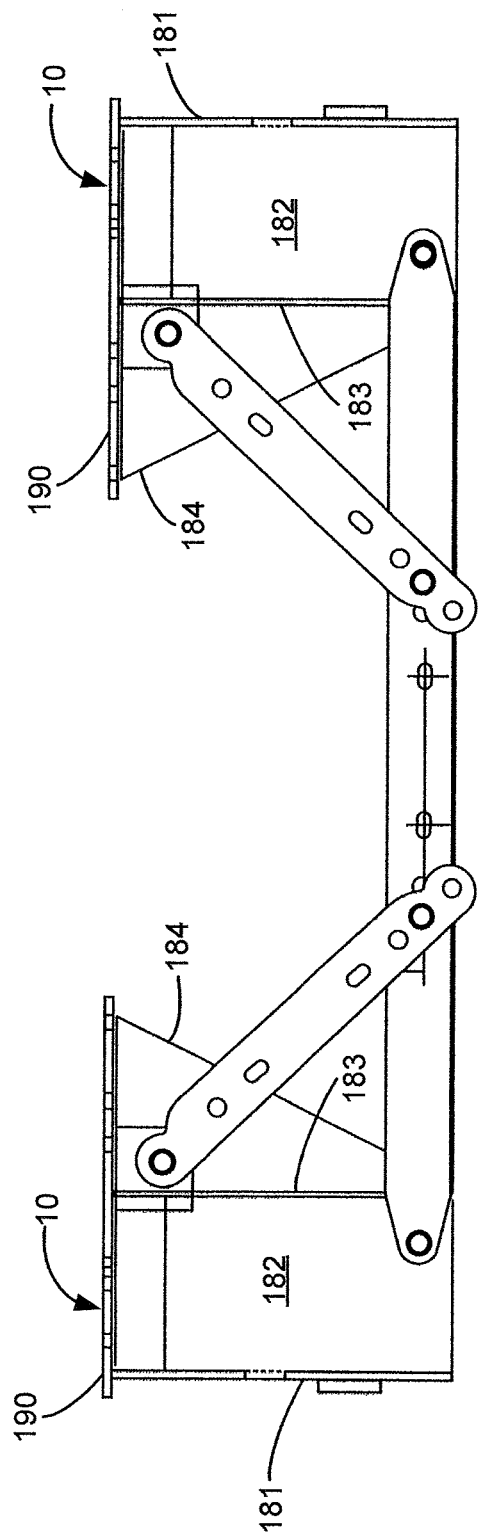
FIG. 2 is a front view of a pair of prior art hangers, showing a cross-brace structure attached to and extending between the hangers.
Figure 3:
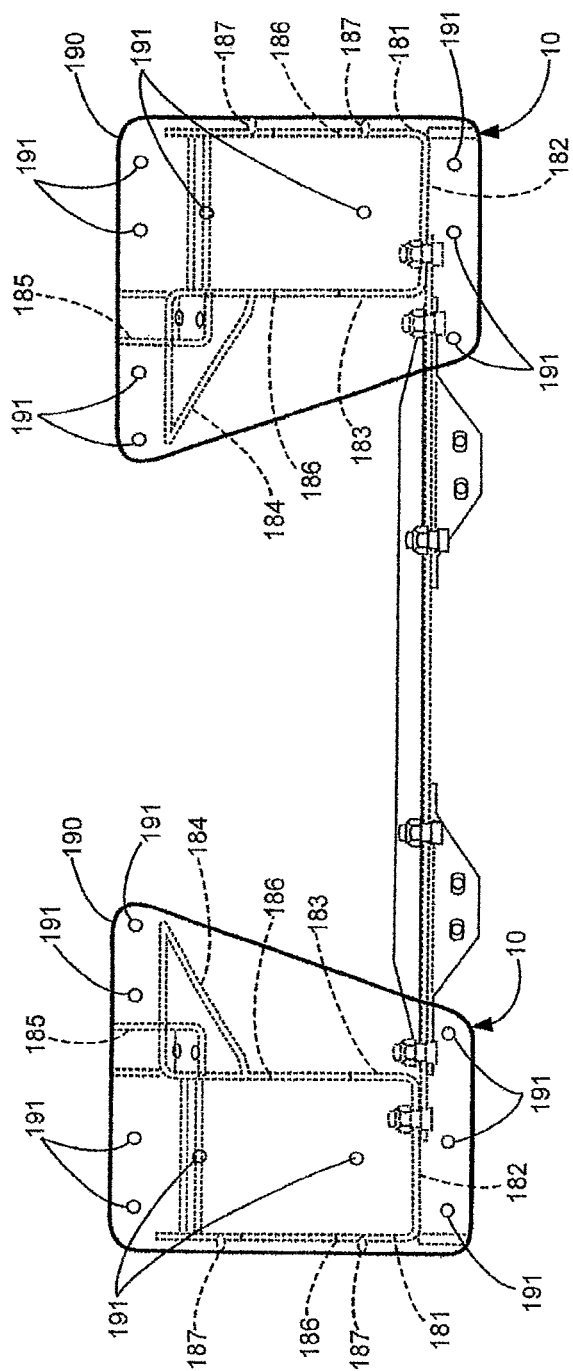
FIG. 3 is top view of the pair of hangers shown in FIG. 2 with hidden portions shown in broken lines, and showing the plurality of openings formed in the top plate of each of the hangers for mounting the hangers to the main members and cross members of the frame of a heavy-duty vehicle.

In order to better understand the structure, assembly and operation of the preferred embodiment hanger of the present invention for an axle/suspension system and frame, the structure, assembly and operation of a prior art bolt-on hanger will be described in detail below. A suspension assembly 14 (only a portion shown) of an axle/suspension system is shown in FIG. 1 pivotally attached to a prior art bolt-on hanger 10. With additional reference to FIGS. 2 and 3, hanger 10 includes a generally U-shaped cross section having an outboard wall 181, a front wall 182 and an inboard wall 183. A flange 184 extends inboard from the rear edge of inboard wall 183 of hanger 10 and is attached to a top plate 190. A shock mount 185 is attached to the rear surface of flange 184 by any suitable means, such as welding. A pair of aligned openings 186 (FIG. 3) are formed through outboard wall 181 and inboard wall 183 of hanger 10. A pair of alignment guides 187 (FIG. 1) are formed on the outboard surface of outboard wall 181 of hanger 10. Hanger 10 also includes top plate 190 that is rigidly attached to the top surfaces of outboard wall 181, front wall 182, inboard wall 183 and flange 184 of the hanger via welds (not shown). Top plate 190 is formed with a plurality of circular openings 191 that correspond to circular openings that are matched-drilled in the cross members and main members of the frame of the heavy-duty vehicle during assembly of the axle/suspension system to the frame of the heavy-duty vehicle. Hanger 10 is mounted on the cross member and main member (not shown) of the frame of a heavy-duty vehicle via bolts (not shown) which extend through top plate openings 191 and respective matched-drilled openings located on the cross member or main member of the frame of the heavy-duty vehicle. The assembly of the hanger to the cross members and main member of the frame of the heavy-duty vehicle will be described in detail immediately below.

Top plate 190 is placed against the bottom surface of the main member and the cross member (not shown) of the frame of the heavy-duty vehicle. Openings in the cross member and main member are matched-drilled according to top plate openings 191 to ensure that proper hanger spacing is obtained. A bolt is disposed through each one of top plate openings 191 and its corresponding matched-drilled opening in the cross member or the main member. A nut is threaded onto each bolt and is tightened to specifications to fixedly mount hanger 10 to the cross member and main member of the frame of the heavy-duty vehicle. Openings in the cross members and the main members are matched drilled in order to assure that the hangers are properly spaced and aligned from one another and to provide proper axle/suspension system alignment and performance.

Installation of prior art bolt-on hanger 10 to the main member and cross member of the frame of the heavy-duty vehicle requires significant time to form match-drilled openings at the time of assembly. Moreover, because there are many different main member and cross member configurations, multiple openings 191 must be patterned onto plate 190 of hanger 10 to accommodate the various opening placements that occur on the main members and the cross members of the frame of the heavy-duty vehicle.

Therefore, a need exists in the art for an improved hanger 10 for axle/suspension systems which can be utilized to replace multiple opening-layout patterns previously required to fit multiple frame configurations, without the need for different configurations of top plate openings 191, and that reduces or eliminates matched-drilled openings in the frame of the heavy-duty vehicle on which the hanger is being mounted. The preferred embodiment hanger for axle/suspension systems of the present invention accomplishes these needs and the structure and installation of the hanger is described in detail below.

Figure 4:
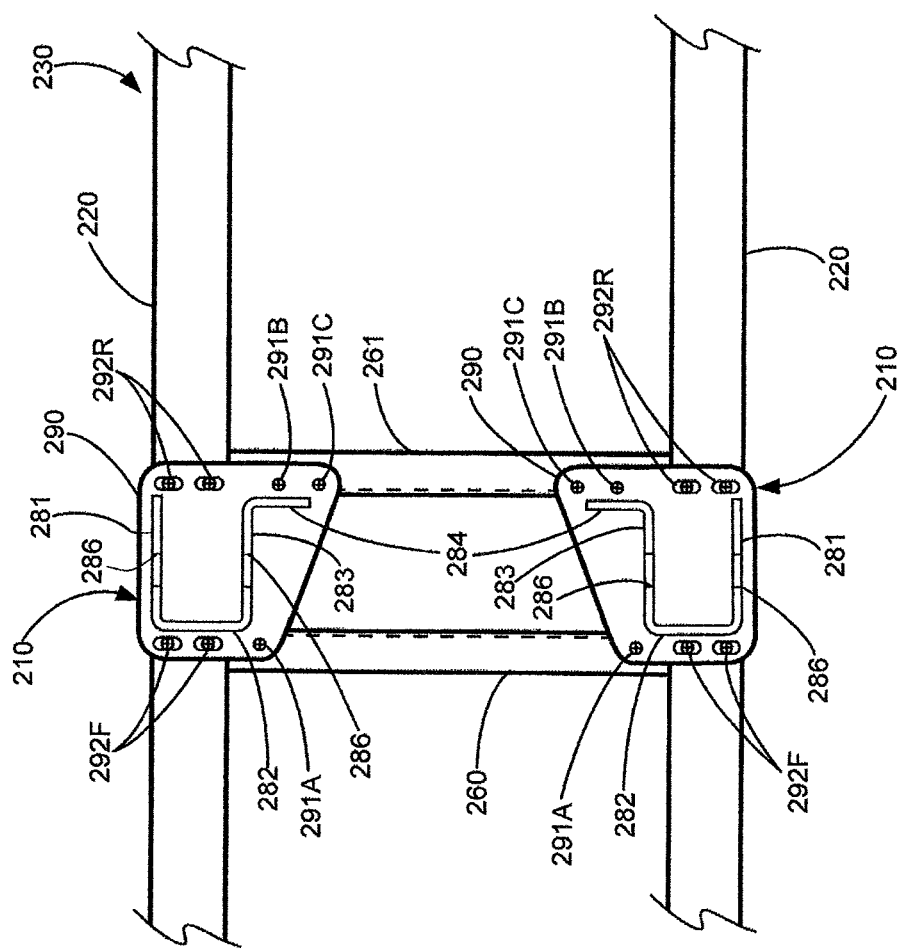
FIG. 4 is a fragmentary bottom view of a pair of first preferred embodiment hangers of the present invention for an axle/suspension system and frame of a heavy-duty vehicle, showing the plurality of inboard circular openings for mounting the hangers to the cross member of the frame of the heavy-duty vehicle, and showing the plurality of outboard slotted openings for mounting the hangers to the main members of the frame of the heavy-duty vehicle.

Turning now to FIG. 4, a pair of first embodiment hangers for axle/suspension systems of the present invention are shown at 210 mounted on a frame 230 of a heavy-duty vehicle, and will be described in detail below. More particularly, hangers 210 are mounted on main members 220 of frame 230. Because hangers 210 are generally identical to one another, only one of the pair of laterally spaced hangers will be described in detail below, with the understanding that a mirror-image hanger is located opposite the hanger being described.

With continuing reference to FIG. 4, hanger 210 is formed having a generally U-shaped horizontal cross section including an outboard wall 281, a front wall 282 and an inboard wall 283. A flange 284 extends inboard from the rear edge of inboard wall 283. A shock mount (not shown) is attached to the rear surface of flange 284 by any suitable means, such as welding. A pair of aligned openings 286 are formed through outboard wall 281 and inboard wall 283 of hanger 210. A suspension assembly (not shown) is pivotally connected to each hanger 210 through aligned openings 286. Hanger 210 also includes a top plate 290 that is rigidly attached to the top surfaces of outboard wall 281, front wall 282, inboard wall 283 and flange 284 via welds (not shown). It should be understood that flange 284 is optional and hanger 210 could be formed without the flange, without changing the overall concept or operation of the present invention.

In accordance with one of the primary features of the present invention, hanger top plate 290 is formed with three circular openings 291A,291B,291C generally inboard of main members 220 and adjacent front and rear cross members 260,261, respectively, when hanger 210 is located for mounting on frame 230. More particularly, first circular opening 291A is located near the front inboard corner of top plate 290 below front cross member 260. Second and third circular openings 291B,C are each located near the rear inboard corner of top plate 290 and are laterally spaced from one another below rear cross member 261. With additional reference to FIG. 5, each one of hanger circular openings 291A,B,C align with a respective one of pre-drilled circular openings 391A,B,C formed in front and rear cross members 260, 261, which will be described in the detailed description of the installation of the hanger below.

A pair of spaced-apart laterally slotted front openings 292F are formed in top plate 290 near the front edge of the top plate and are generally laterally spaced from each other and from first circular opening 291A. A pair of spaced-apart laterally slotted rear openings 292R also are formed in top plate 290 near the rear edge of the top plate and are generally laterally spaced from each other and from second and third circular openings 291B,C. Front and rear slotted openings 292F,R align with front and rear pre-drilled circular openings 392F,R formed in main members 220. Hanger 210 is mounted on cross members 260,261 and main member 220 of the sub-frame or frame of a heavy-duty vehicle via bolts (not shown) which extend through top plate openings 291A,B,C, 292F,R and aligned openings 391A,B,C in front and rear cross members 260,261, respectively, and aligned openings 392F,R in main member 220 of the frame of the heavy-duty vehicle. Having now described the structure of first preferred embodiment hanger 210 of the present invention, the installation of the hanger onto cross members 260,261 and main member 220 of frame 230 of the heavy-duty vehicle now will be described.

A first method of installation of first preferred embodiment hanger 210 of the present invention on front and rear cross members 260,261 and main member 220 of the frame of the heavy-duty vehicle includes placing top plate 290 of hanger 210 against the bottom surfaces of its respective main member and front and rear cross members. Circular openings 291A,B,C formed in hanger top plate 290 are aligned with openings 391A,B,C pre-formed in front and rear cross members, 260,261, and a bolt (not shown) having a threaded end is disposed through each one of the aligned openings. A nut (not shown) is threaded onto the bolt (not shown) in order to mount hanger 210 to the front and rear cross members 260,261. Slotted openings 292F,R formed in hanger top plate 290 are generally aligned with openings 392F,R formed in main member 220, and a bolt (not shown) having a threaded end is disposed through each of the aligned openings. A nut (not shown) is threaded onto each of the bolts (not shown) in order to mount hanger 210 to main member 220. The nuts are then tightened in order to complete installation of the hanger and axle/suspension system on frame 230. It should be understood that additional fastening means, such as washers and the like, could also be utilized in conjunction with hanger 210 without changing the overall concept or operation of the present invention.

Circular openings 291A,B,C formed in hanger top plate 290 ensure proper spacing and alignment of the hanger relative to cross members 260,261 of the frame of the heavy-duty vehicle. Moreover, slotted openings 292F,R provide universal attachment to various main member opening 392F,R configurations. More specifically, because hanger openings 292F,R are slotted, they will align with various configurations and patterns of openings 392F,R formed in main member 220 without the need for forming matched-drilled openings in the main members.

A second method of installation of first preferred embodiment hanger 210 of the present invention on front and rear cross members 260,261 and main member 220 of the frame of the heavy-duty vehicle includes placing top plate 290 of hanger 210 against the bottom surfaces of its respective main member and the front and rear cross members. Slotted openings 292F,R formed in hanger top plate 290 are generally aligned with pre-formed openings 392F,R formed in main member 220, and a bolt (not shown) having a threaded end is disposed through each of the aligned openings. A nut (not shown) is threaded onto each of the bolts (not shown) in order to loose-fit mount hanger 210 to main member 220. Hanger 210 is then adjusted utilizing the play or space provided by slotted openings 292F,R to properly align the hanger to specification. Circular inboard openings 291A,B,C formed in hanger top plate 290 then are aligned with front and rear cross members, 260,261, and openings 391A,B,C are matched-drilled into the front and rear cross members. A bolt (not shown) having a threaded end is disposed through each one of the aligned openings. A nut (not shown) is threaded onto each of the bolts (not shown) in order to mount hanger 210 to the front and rear cross members 260,261. The bolts are then tightened in order to complete installation of the hanger and axle/suspension system on frame 230. It should be understood that additional fastening means, such as washers and the like could also be utilized in conjunction with hanger 210 without changing the overall concept or operation of the present invention.

Figure 6:
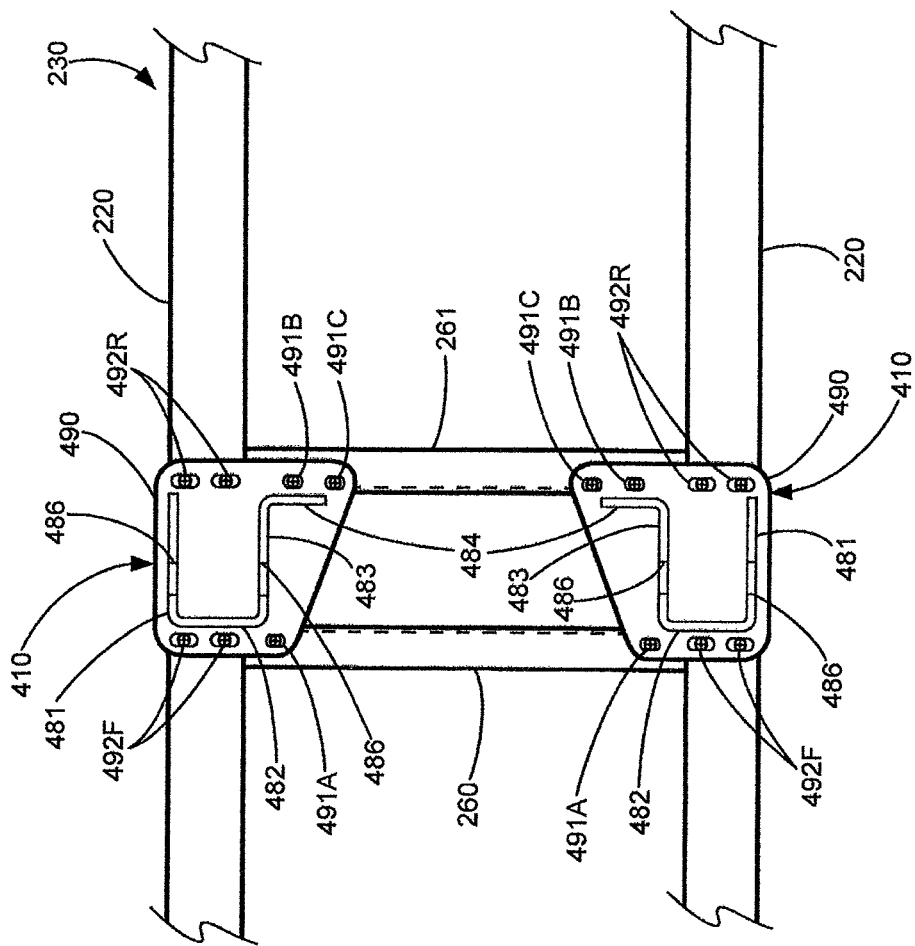
FIG. 6 is a fragmentary bottom view of a pair of second preferred embodiment hangers of the present invention for an axle/suspension system and frame of a heavy-duty vehicle, showing the plurality of inboard laterally oriented oblong-round openings for mounting the hangers to the cross members of the frame of the heavy-duty vehicle, and showing the plurality of outboard slotted openings for mounting the hangers to the main members of the frame of the heavy-duty vehicle.

Turning now to FIG. 6, a pair of second preferred embodiment hangers for axle/suspension systems of the present invention are shown at 410 mounted on a frame 230 of a heavy-duty vehicle, and will be described in detail below. More particularly, hangers 410 are mounted on main members 220 of frame 230. Because hangers 410 are generally identical to one another, only one of the laterally spaced pair of hangers will be described in detail below, with the understanding that a mirror-image hanger is located opposite the hanger being described.

Figure 6A:
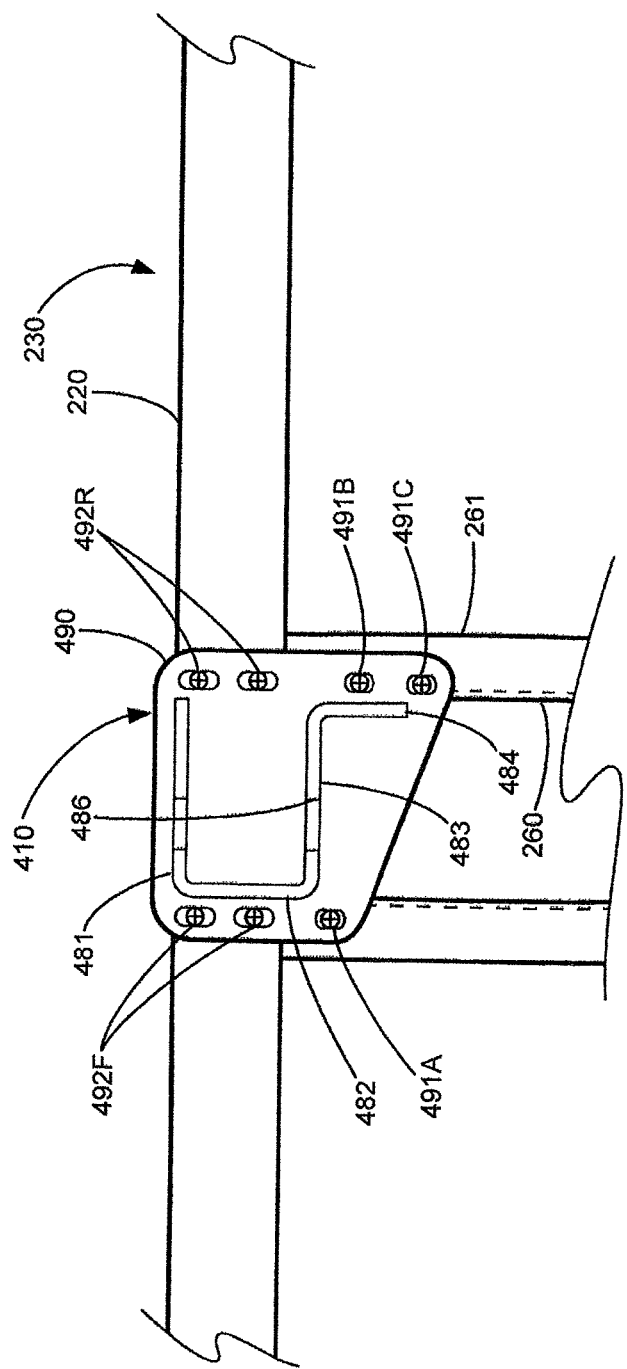
FIG. 6A is an enlarged fragmentary bottom view of the driver side second preferred embodiment hanger of the present invention shown in FIG. 6.

With continuing reference to FIG. 6 and with additional reference to FIG. 6A, hanger 410 is formed having a generally U-shaped horizontal cross-section including an outboard wall 481, a front wall 482 and an inboard wall 483. A flange 484 extends inboard from the rear edge of inboard wall 483. A shock mount (not shown) is attached to the rear surface of flange 484 by any suitable means, such as welding. A pair of aligned openings 486 are formed through outboard wall 481 and inboard wall 483 of hanger 410. A suspension assembly (not shown) is pivotally connected to each hanger 410 through aligned openings 486. Hanger 410 also includes a top plate 490 that is rigidly attached to the top surfaces of outboard wall 481, front wall 482, inboard wall 483 and flange 484 via welds (not shown). It should be understood that flange 484 is optional and hanger 410 could be formed without the flange, without changing the overall concept or operation of the present invention.

In accordance with one of the primary features of the present invention, top plate 490 is formed with three laterally oriented oblong-round openings 491A,491B,491C located generally inboard of main members 220 and adjacent front and rear cross members 260,261, respectively, when hanger 210 is located for mounting on frame 230. More particularly, first oblong-round opening 491A is located near the front inboard corner of top plate 490 below front cross member 260. Second and third oblong-round openings 491 B,C are each located near the rear inboard corner of top plate 490 and are laterally spaced from one another below rear cross member 261. With additional reference to FIG. 7, oblong-round openings 491A,B,C generally align with pre-drilled circular openings 391A,B,C formed in front and rear cross members 260, 261, respectively, during installation of the hangers and the axle/suspension system on the vehicle frame described below.

Figure 5:
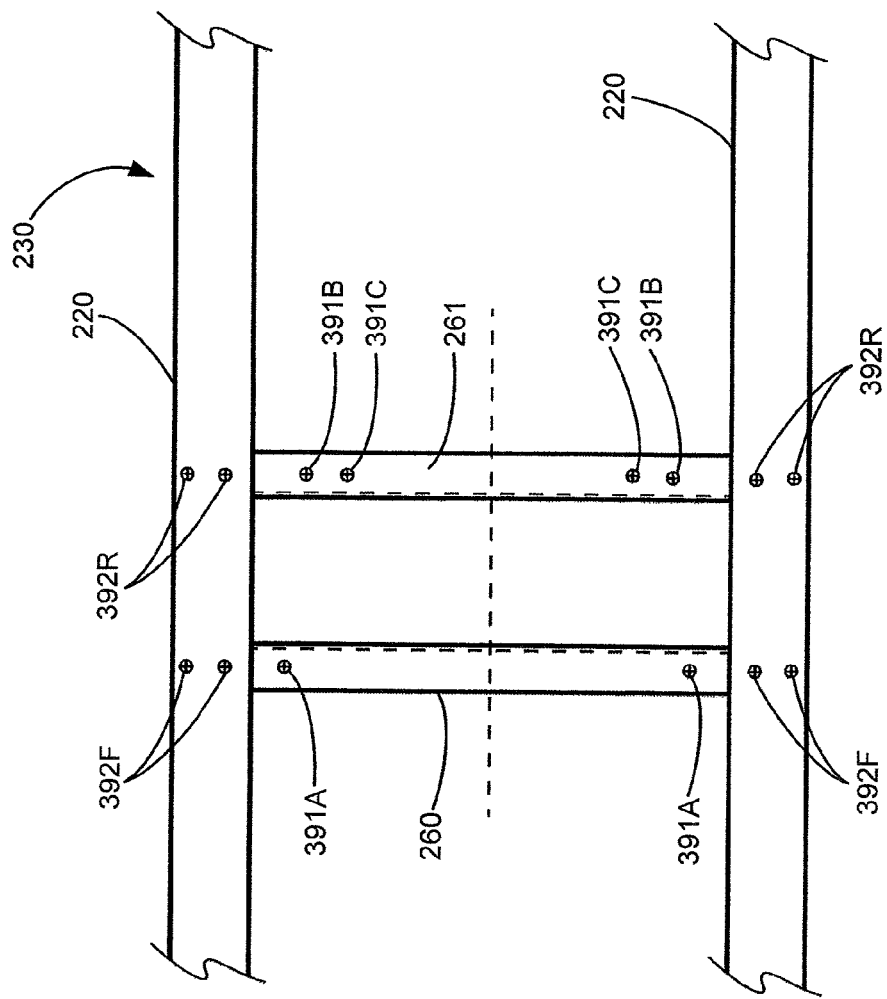
FIG. 5 is a fragmentary bottom view of the frame of the heavy-duty vehicle onto which the first preferred embodiment hanger of the present invention for axle/suspension systems is mounted, showing the corresponding inboard openings in the cross members and the outboard openings in the main members through which bolts are placed in order to connect the hangers to the frame of the heavy-duty vehicle.

A pair of spaced-apart laterally slotted front openings 492F are formed in top plate 490 near the front edge of the top plate and are generally laterally spaced from each other and from first oblong-round opening 491A. A pair of spaced-apart laterally slotted rear openings 492R also are formed in top plate 490 near the rear edge of the top plate and are generally laterally spaced from each other and from second and third oblong-round openings 491B,C. Front and rear slotted openings 492F,R generally align with front and rear pre-drilled circular openings 392F,R formed in main members 220 (FIG. 5). Hanger 410 is mounted on cross members 260,261 and main member 220 of the sub-frame or frame of a heavy-duty vehicle via bolts (not shown), which extend through top plate openings 491A,B,C, 492F,R and aligned openings 391A,B,C in front and rear cross members 260, 261, respectively, and aligned openings 392F,R in main member 220 of the frame of the heavy-duty vehicle. Having now described the structure of second preferred embodiment hanger 410 of the present invention, the installation of the hanger onto cross members 260,261 and main member 220 of frame 230 of the heavy-duty vehicle now will be described.

A method of installation of second preferred embodiment hanger 410 of the present invention on front and rear cross members 260,261 and main member 220 of the frame of the heavy-duty vehicle includes placing top plate 490 of hanger 410 against the bottom surfaces of its respective main member and front and rear cross members. Each one of oblong-round openings 491A,B,C formed in hanger top plate 490 are generally aligned with a respective opening 391A,B,C pre-formed in front and rear cross members, 260,261, and a bolt (not shown) having a threaded end is disposed through each one of the aligned openings. A nut (not shown) is threaded and loose-fit onto the bolt (not shown) in order to loose-fit mount hanger 410 to front and rear cross members 260,261. Hanger 410 is then adjusted utilizing the play or space provided by oblong-round openings 491A,B,C to properly align the hanger. Slotted openings 492F,R formed in hanger top plate 490 then are generally aligned with openings 392F,R formed in main member 220, and a bolt (not shown) having a threaded end is disposed through each of the aligned openings. A nut (not shown) is threaded onto each of the bolts (not shown) in order to mount hanger 410 to main member 220. The nuts are then tightened in order to complete installation of the hanger and axle/suspension system on frame 230.

Oblong-round openings 491A,B,C formed in hanger top plate 490 ensure proper spacing and provide sufficient adjustability to ensure proper alignment of the hanger relative to cross members 260,261 of the frame of the heavy-duty vehicle. Moreover, slotted openings 492F,R provide universal attachment to various main member opening 392F,R configurations. More specifically, because hanger openings 492F,R are slotted, they will align with various configurations and patterns of openings 392F,R formed in main member 220 without the need for forming matched-drilled openings in the main members.

Figure 7:
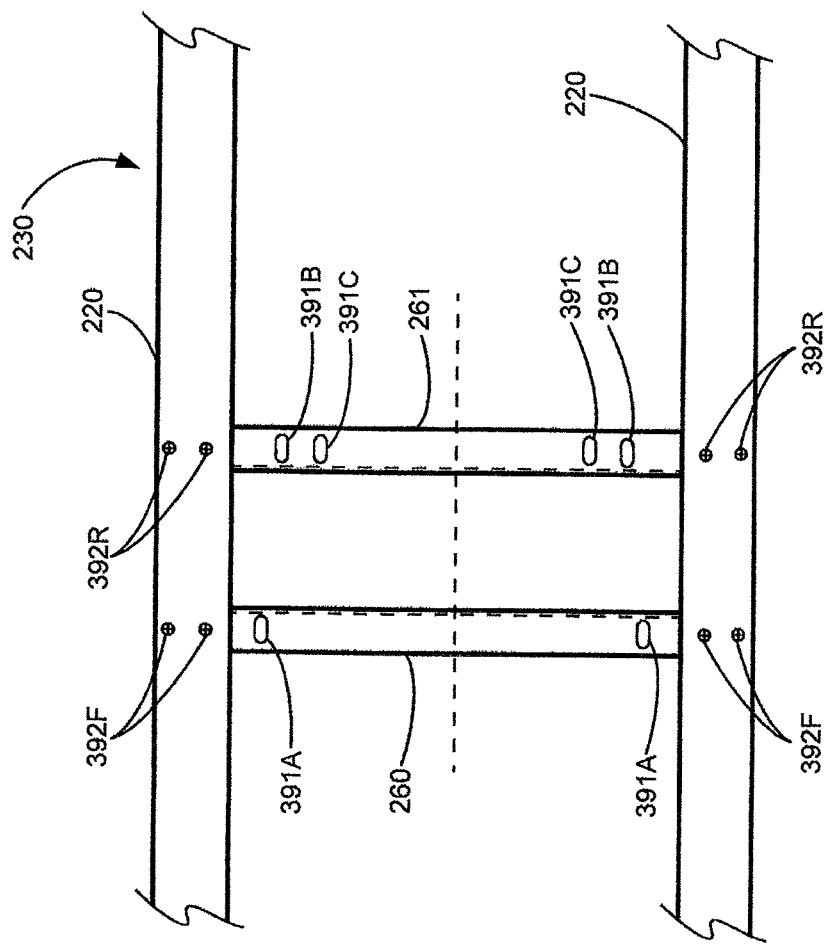
FIG. 7 is a fragmentary bottom view of the frame of the heavy-duty vehicle onto which the second preferred embodiment hanger of the present invention for axle/suspension systems is mounted, showing the corresponding longitudinally oriented oblong-round openings in the cross members and the circular openings formed in the main members, through which bolts are placed in order to connect the hangers to the frame of the heavy-duty vehicle.

It is contemplated that openings 391A,B,C formed in cross members 260 and 261, respectively, of frame 230 alternatively could be formed as longitudinally oriented oblong-round openings, with the oblong portion of the openings extending in the longitudinal direction with respect to the frame as shown in FIG. 7. These oblong-round openings 391A,B,C provide additional hanger and axle/suspension system longitudinal adjustment when hanger 410 is mounted on frame 230.

As can be seen from the detailed description of the structure of hangers 210 and 410 as well as the installation of the hangers and axle/suspension systems to the frame of the heavy-duty vehicle, the hangers eliminate and/or reduce the need for forming matched-drilled openings during assembly of the hangers to the frame, thereby saving time and cost associated with forming such matched-drilled openings. In addition, the configuration of openings 291A,B,C, 491A,B,C and 292F,R, 492F,R in hanger top plates 290,490, respectively accommodate multiple frame configurations without requiring additional opening patterns formed in the top plate of the hanger. Moreover, openings 291A,B,C, 491A,B,C and slotted openings 292F,R, 492F,R provide improved adjustment and/or control of hanger 210, 410 spacing, thereby reducing the likelihood of toe-in or toe-out conditions at the axle spindles, and thereby potentially reducing irregular tire wear. In addition, openings 291A,B, C, 491A,B,C and slotted openings 292F,R, 492F,R provide for changing the lateral spacing of hanger 210,410 in order to provide tire clearance from suspension and trailer frame components.

It is contemplated that first and second embodiment hangers 210,410 of the present invention could be utilized in conjunction with tractor-trailers or heavy-duty vehicles having one or more than one axle. It is further contemplated that first and second embodiment hangers 210,410 of the present invention could be formed from several pieces as shown in the preferred embodiment, or could be integrally formed from a single piece without changing the overall concept or operation of the present invention, or could be formed of various suitable materials. It is even further contemplated that first and second preferred embodiment hangers 210, 410 of the present invention could be utilized on frames which are non-movable or movable without changing the overall concept or operation of the invention. It is yet even further contemplated that first and second preferred embodiment hangers 210, 410 of the present invention could be utilized on all types of leading and/or trailing arm beam-type designs and configurations known to those skilled in the art, without changing the overall concept or operation of the present invention. For example, the present invention finds application in beams or arms that are made of materials other than steel, such as aluminum, other metals, metal alloys, composites, and/or combinations thereof. The present invention also finds application in beams or arms with different designs and/or configurations than that shown above, such as solid beams, shell-type beams, truss structures, intersecting plates, parallel plates, multiple-part beams and beams that are integrated with an axle.

Accordingly, the hanger for axle/suspension systems is simplified, provides an effective, safe, inexpensive and efficient structure and method which achieves all the enumerated objectives, provides for eliminating difficulties encountered with prior art hangers, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the hanger for axle/suspension systems is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. A hanger for a suspension assembly of an axle/suspension system of a heavy-duty vehicle comprising:
   an outboard wall laterally spaced apart from an inboard wall, said outboard wall and said inboard wall connected via a connecting wall, the outboard wall and the inboard wall each being formed with an aligned opening extending through said outboard wall and said inboard wall for pivotally connecting said suspension assembly to said hanger,
   a top plate connected to the inboard wall, the outboard wall and said connecting wall, said top plate being formed with at least one circular opening or oblong-round opening and at least one laterally slotted opening, a first fastener disposed through said at least one circular opening or oblong-round opening, and a second fastener disposed through said at least one laterally slotted opening, for mounting the hanger directly to a frame of said heavy-duty vehicle.

2. The hanger for axle/suspension systems of a heavy-duty vehicle of claim 1, said first fastener being disposed through a circular opening formed in a cross member of said frame of said heavy-duty vehicle.

3. The hanger for axle/suspension systems of a heavy-duty vehicle of claim 1, said first fastener being disposed through an oblong-round opening formed in a cross member of said frame of said heavy-duty vehicle.

4. The hanger for axle/suspension systems of a heavy-duty vehicle of claim 1, said second fastener being disposed through a circular opening formed in a main member of said frame of said heavy-duty vehicle.

5. The hanger for axle/suspension systems of a heavy-duty vehicle of claim 1, said hanger pivotally mounted to a suspensions assembly of said heavy-duty vehicle.

6. The hanger for axle/suspension systems of a heavy-duty vehicle of claim 1, wherein said at least one laterally slotted opening comprises a pair of transversely aligned and transversely spaced openings formed adjacent a front end of said hanger top plate.

7. The hanger for axle/suspension systems of a heavy-duty vehicle of claim 1, wherein said at least one laterally slotted opening comprises a pair of transversely aligned and transversely spaced opening formed adjacent a rear end of said hanger top plate.

8. The hanger for axle/suspension systems of a heavy-duty vehicle of claim 1, wherein said at least one circular opening or oblong-round opening comprises three circular openings or three oblong-round openings.

9. The hanger for axle/suspension systems of a heavy-duty vehicle of claim 1, wherein said hanger comprises a pair of hangers, said hangers transversely spaced from one another, each one of said hangers pivotally mounting a suspension assembly of the axle/suspension system.

10. A method for mounting a hanger for a suspension assembly of an axle/suspension system of a heavy-duty vehicle, comprising the following steps:
   a) providing a hanger for a suspension assembly of an axle/suspension system of a heavy-duty vehicle, including an outboard wall laterally spaced apart from an inboard wall, said outboard wall connected to said inboard wall via a connecting wall, the outboard wall and the inboard wall being formed with an aligned opening extending through said outboard wall and said inboard wall for pivotally connecting said suspension assembly to said hanger,
   b) connecting a top plate to the inboard wall, the outboard wall and said connecting wall, said top plate being formed with at least one circular opening or oblong-round opening and at least one laterally slotted opening,
   c) disposing a first fastener through said at least one circular opening or oblong-round opening for mounting said hanger to a cross beam of a frame of said vehicle, and
   d) disposing a second fastener through said at least one laterally slotted opening for mounting said hanger directly to a main member of a frame of said heavy-duty vehicle.

11. The method for mounting a hanger for axle/suspension systems of a heavy-duty vehicle of claim 10, wherein said first fastener is disposed through a circular opening formed in a cross member of said frame of said heavy-duty vehicle.

12. The method for mounting a hanger for axle/suspension systems of a heavy-duty vehicle of claim 10, wherein said first fastener is disposed through an oblong-round opening formed in a cross member of said frame of said heavy-duty vehicle.

13. The method for mounting a hanger for axle/suspension systems of a heavy-duty vehicle of claim 10, said second fastener being disposed through a circular opening formed in a main member of said frame of said heavy-duty vehicle.

14. The method for mounting a hanger for axle/suspension systems of a heavy-duty vehicle of claim 10, said hanger pivotally mounted to a suspensions assembly of said heavy-duty vehicle.

15. The method for mounting a hanger for axle/suspension systems of a heavy-duty vehicle of claim 10, wherein said hanger comprises a pair of hangers, said hangers transversely spaced from one another, each one of said hangers pivotally mounting a suspension assembly of the axle/suspension system.

16. A hanger for a suspension assembly of an axle/suspension system of a heavy-duty vehicle comprising:
   an outboard wall laterally spaced apart from an inboard wall, said outboard wall and said inboard wall connected via a connecting wall, the outboard wall and the inboard wall each being formed with an aligned opening extending through said outboard wall and said inboard wall for pivotally connecting said suspension assembly to said hanger,
   a top plate connected to the inboard wall, the outboard wall and said connecting wall, said top plate being formed with at least one circular opening or oblong-round opening and at least one laterally slotted opening, a first fastener disposed through said at least one circular opening or oblong-round opening, and a second fastener disposed through said at least one laterally slotted opening, said first fastener being disposed through a circular opening formed in a cross member of said frame of said heavy-duty vehicle for mounting the hanger to a frame of said heavy-duty vehicle.

17. A hanger for a suspension assembly of an axle/suspension system of a heavy-duty vehicle comprising:
   an outboard wall laterally spaced apart from an inboard wall, said outboard wall and said inboard wall connected via a connecting wall, the outboard wall and the inboard wall each being formed with an aligned opening extending through said outboard wall and said inboard wall for pivotally connecting said suspension assembly to said hanger,
   a top plate connected to the inboard wall, the outboard wall and said connecting wall, said top plate being formed with at least one circular opening or oblong-round opening and at least one laterally slotted opening, a first fastener disposed through said at least one circular opening or oblong-round opening, and a second fastener disposed through said at least one laterally slotted opening, said first fastener being disposed through an oblong-round opening formed in a cross member of said frame of said heavy-duty vehicle for mounting the hanger to a frame of said heavy-duty vehicle.

* * * * *